(12) United States Patent
Nice et al.

(10) Patent No.: US 9,208,155 B2
(45) Date of Patent: Dec. 8, 2015

(54) ADAPTIVE RECOMMENDATION SYSTEM

(75) Inventors: Nir Nice, Kfar Veradim (IL); Dror Kremer, Tel Aviv (IL); Daniel Sitton, Tel Aviv (IL); Michael Feldman, Pardesiya (IL); Shimon Shlevich, Ramat-Gan (IL); Ori Folger, Tel Aviv-Yafo (IL)

(73) Assignee: Rovi Technologies Corporation, Burbank, CA (US)

( * ) Notice: Subject to any disclaimer, the term of this patent is extended or adjusted under 35 U.S.C. 154(b) by 902 days.

(21) Appl. No.: 13/229,482

(22) Filed: Sep. 9, 2011

(65) Prior Publication Data

US 2013/0066819 A1    Mar. 14, 2013

(51) Int. Cl.
  *G06N 5/04*     (2006.01)
  *G06F 17/30*    (2006.01)
  *G06Q 30/02*    (2012.01)
  *G06Q 30/06*    (2012.01)

(52) U.S. Cl.
  CPC ............ *G06F 17/30029* (2013.01); *G06N 5/04* (2013.01); *G06Q 30/0255* (2013.01); *G06Q 30/0631* (2013.01)

(58) Field of Classification Search
  CPC ............................ G06N 5/04; G06F 17/30029
  USPC ............................................................ 706/14
  See application file for complete search history.

(56) References Cited

U.S. PATENT DOCUMENTS

| 7,720,720 B1 | 5/2010 | Sharma et al. |
| 7,783,635 B2 | 8/2010 | Maes |
| 2002/0052873 A1 | 5/2002 | Delgado et al. |

(Continued)

FOREIGN PATENT DOCUMENTS

| CN | 1716257 A | 1/2006 |
| CN | 101276375 A | 10/2008 |

(Continued)

OTHER PUBLICATIONS

"International Search Report", Mailed Date: Feb. 26 2013, Application No. PCT/US2012/053480, Filed Date: Aug. 31, 2012, pp. 10.

(Continued)

*Primary Examiner* — Lut Wong
(74) *Attorney, Agent, or Firm* — Ropes & Gray LLP

(57) ABSTRACT

A recommendation system for optimizing content recommendation lists is disclosed. The system dynamically tracks a list interaction history of a user, which details that user's interactions with a plurality of different lists presenting different recommended items to that user. The system automatically correlates one or more list preferences with that user based on the list interaction history, and builds a recommendation list with a plurality of candidate items having different recommendation confidences. The recommendation list is built such that each candidate item with a higher recommendation confidence is prioritized over each candidate item with a lower recommendation confidence according to the one or more list preferences correlated to that user.

20 Claims, 6 Drawing Sheets

(56) References Cited

U.S. PATENT DOCUMENTS

| | | |
|---|---|---|
| 2004/0044677 A1 | 3/2004 | Huper-Graff et al. |
| 2008/0214157 A1* | 9/2008 | Ramer et al. ............... 455/414.1 |
| 2009/0006368 A1 | 1/2009 | Mei et al. |
| 2009/0019488 A1 | 1/2009 | Ruiz-Velasco et al. |
| 2009/0158342 A1 | 6/2009 | Mercer et al. |
| 2010/0064040 A1 | 3/2010 | Wise et al. |
| 2010/0076857 A1 | 3/2010 | Deo et al. |
| 2010/0191582 A1 | 7/2010 | Dicker et al. |
| 2010/0287033 A1 | 11/2010 | Mathur |
| 2011/0093415 A1 | 4/2011 | Rhee et al. |

FOREIGN PATENT DOCUMENTS

| | | |
|---|---|---|
| KR | 100608645 B1 | 8/2006 |
| WO | WO 2009/045899 | 4/2009 |

OTHER PUBLICATIONS

Aztiria, et al., "Learning about preferences and common behaviours of the user in an intelligent environment", Retrieved at <<http://www.infj.ulst.ac.uki~jcaug/bmibook.pdf>>, In Behaviour Monitoring and Interpretation: Smart Environments, 2009, pp. 289-315.

Rovira, et al., "IndexTV: A MPEG-7 Based Personalized Recommendation System for Digital TV", Retrieved at <<http://citeseerx.ist.psu.edu/viewdoc/download?doi=10.1.1.78.5025&rep=rep1&type=pdf>>, IEEE International Conference on Multimedia and Expo (ICME), 2004, pp. 823-826.

* cited by examiner

ADAPTIVE RECOMMENDATION SYSTEM

BACKGROUND

Content recommendations offer an effective mechanism for introducing new content to a potential customer. Typically, the recommended content is chosen based on the customer's purchasing history. The format and manner in which the recommended content is presented tends to be similar for all customers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A content recommendation system is presented. The system dynamically tracks a list interaction history of a user, which details that user's interactions with a plurality of different lists presenting different recommended items to that user. The system automatically correlates one or more list preferences with that user based on the list interaction history, and builds a recommendation list with a plurality of candidate items having different recommendation confidences. The recommendation list is built such that each candidate item with a higher recommendation confidence is prioritized over each candidate item with a lower recommendation confidence according to the one or more list preferences correlated to that user.

DETAILED DESCRIPTION

Current recommendation systems attempt to predict a user's taste using a variety of filters, typically based on the features of the content that user has previously selected (e.g., genre, author, director, actor, etc.) and/or the selections previously made by similar users, such as in the case of collaborative filter based recommendations. However, the user's behavior when interacting with a list of recommended items is typically not considered apart from the actual content of the recommended items. As described below, the way in which the user has previously interacted with the specific presentation of recommended items, divorced from the actual content of the recommended items, may form a basis for how subsequent user-specific content recommendations are presented to the user. In other words, the presentation of a set of candidate recommended items to a user can be tailored based on the way that user has interacted with various presentations of recommended items in the past.

Figure 1:
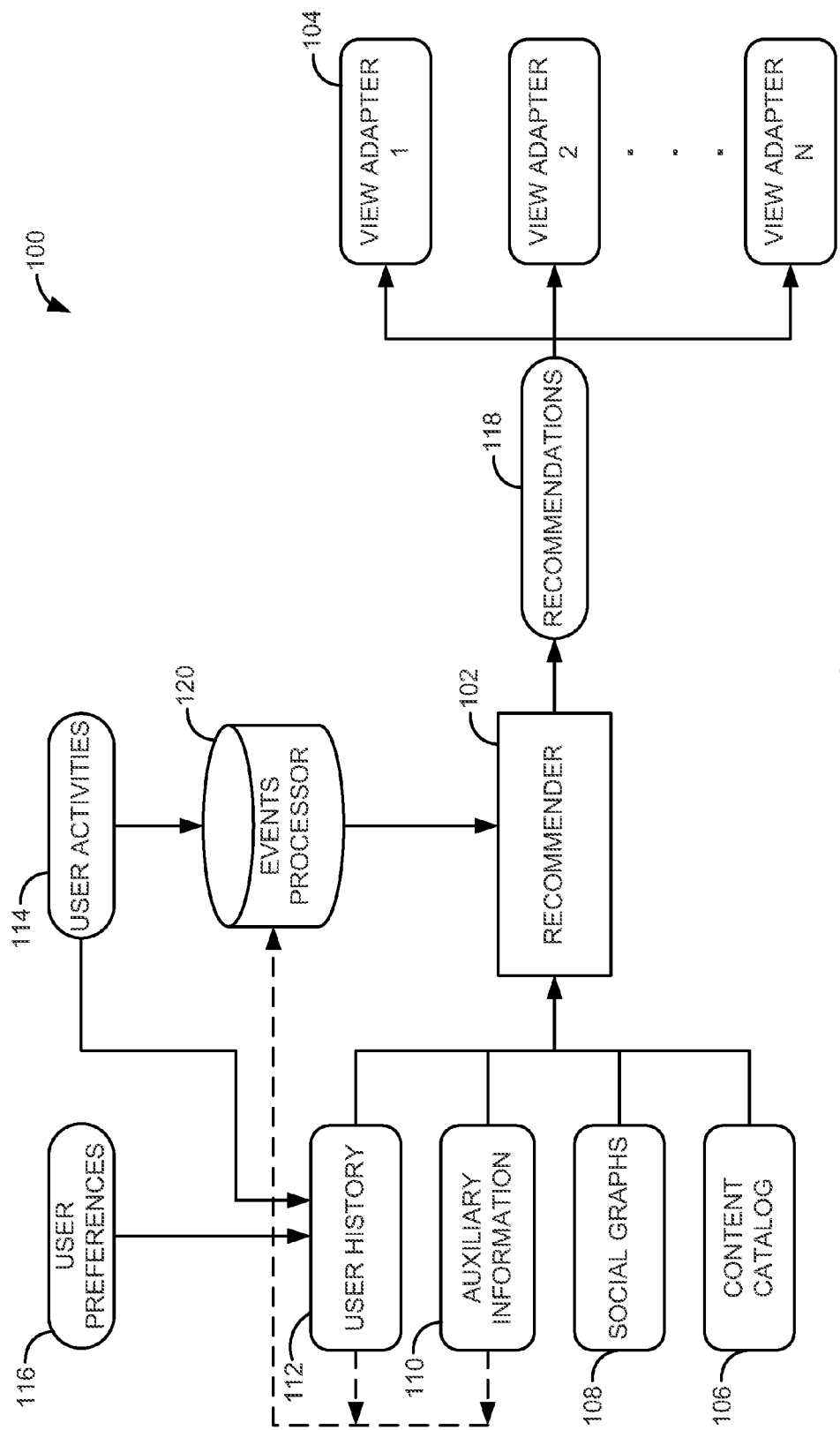
FIG. 1 schematically shows a recommendation system according to an embodiment of the present disclosure.

Turning to FIG. 1, an example recommendation system 100 is shown. Recommendation system 100 may build a user-specific recommendation list for presentation to the user. The recommendation system includes a recommender 102 that may use a variety of inputs and filters to determine candidate content items to recommend to the user. Additionally, the recommendation system 100 includes one or more view adapters 104 (e.g., view adapter 1, view adapter 2, ..., view adapter N) to determine the manner in which the content is presented to the user. Simplified example recommendation lists are shown in and described in more detail with respect to FIGS. 3-5 and FIGS. 6A-6C.

Recommended items may be selected from a content catalogue 106. The content catalogue 106 may be a user-nonspecific database of content items available for the user to purchase or view. The items contained within the content catalogue 106 may be tagged with various features including type of content, genre of content, user ratings of the items, etc. While the embodiment shown in FIG. 1 depicts a single content catalogue 106, multiple content catalogues may be used. For example, in some embodiments, different content catalogues may contain different types of content.

The content catalogue 106 may track purchases and ratings of the content items by all users. The content catalogue 106 may use the tracked information to rank the content items according to popularity. Thus, the content catalogue 106 provides a listing of the content items tagged by various features including popularity. The recommender 102 may use the content listings as well as the features tags when assembling the user-specific recommendation list, as will be described in more detail below.

The recommender 102 may also receive user-specific input from a social graphs database 108. The social graphs database 108 may include the purchasing and ratings histories of friends of the user. These histories may be used by the recommender 102 when assembling the user-specific recommendation list. Additionally, the recommender 102 may receive auxiliary information 110, such as the type of device the recommendation list will be viewed on, and use the information when compiling the recommendation list.

A user history 112 may also provide user-specific input to the recommender 102. The user history 112 may track and compile various details about user engagement with content items. For example, the user history 112 may track user activities 114. User activities 114 may include purchases of content by the user, ratings of content by the user, views of content by the user, etc. Additionally, user history 112 may include user preferences 116. User preferences 116 may detail content-specific factors that the user prefers, such as preferred genres. User preferences 116 may also detail content-independent factors that the user prefers. These content-independent factors may include various attributes of how the recommendation list is presented to the user, such as the length of the list, font of items within the list, amount of text displayed along with the items, etc.

The user preferences 116 may be automatically determined by user engagement with a plurality of recommendation lists provided to the user. Each time a recommendation list is built by the recommender 102 and view adapter 104, it is presented to the user and user interaction with the list is tracked. Based on this tracking, user list preferences can be automatically determined without the user explicitly declaring any particular preference. In other words, the user preferences are inferred from the user's actions. Additional detail about determining user preferences will be described with respect to FIG. 2 below.

The recommender 102 may take the input from the content catalogue 106, social graphs database 108, auxiliary information 110, and user history 112 to determine a list of candidate recommended items.

The candidate recommended items may include a "recommended for you" subgroup, based on input from the user history 112. To determine the candidate recommended items from the user history 112, the recommender 102 may use a features filter, wherein candidate items that are tagged with features similar to features of items the user has previously consumed are recommended. In another embodiment, the recommendations may be determined by a collaborative filter, wherein candidate items consumed by other users similar to the user (e.g. with similar purchasing and/or ratings histories) are recommended. Any suitable filter or algorithm may be used to determine the recommended items.

Additionally, the recommended items may include a "social" subgroup, based on input from the social graphs database 108, or a "popular" subgroup, based on the popularity tracking in the content catalogue 106. For example, the items most highly rated or consumed by all friends of the user may be included in the social subgroup. In other embodiments, items highly rated or consumed by certain user-preferred friends may be part of the social subgroup.

The recommender 102 builds a list of candidate recommendation items 118. The list of candidate recommendation items 118 may include items from one or more of the above described or other subgroups.

The recommender 102 supplies the candidate recommendation items 118 to one or more view adapters 104. The view adapters 104 are configured to format the content and layout of the candidate recommendation items 118, or a subset thereof, based on feedback from the user history 112, as described in more detail below with respect to FIG. 2. Different view adapters, such as view adapter 1, view adapter 2, and view adapter N, may be used with different users, as they each may apply different user-specific logic in order to determine the format of the different recommendation lists. Different view adapters may also be used for the same user viewing the recommendation list on different devices, so that the recommended items can be presented to a specific user on a specific device in a desired manner. Once the view adapter 104 has distributed the recommended items into the desired formatted list, the recommendation list is presented to the user.

Recommendation system 100 also includes a real-time events processor 120 to provide real-time feedback to the recommender 102 to continually update the recommendation list based on user activities 114, user preferences 116, user history 112, and any additional auxiliary information 110.

Figure 2:
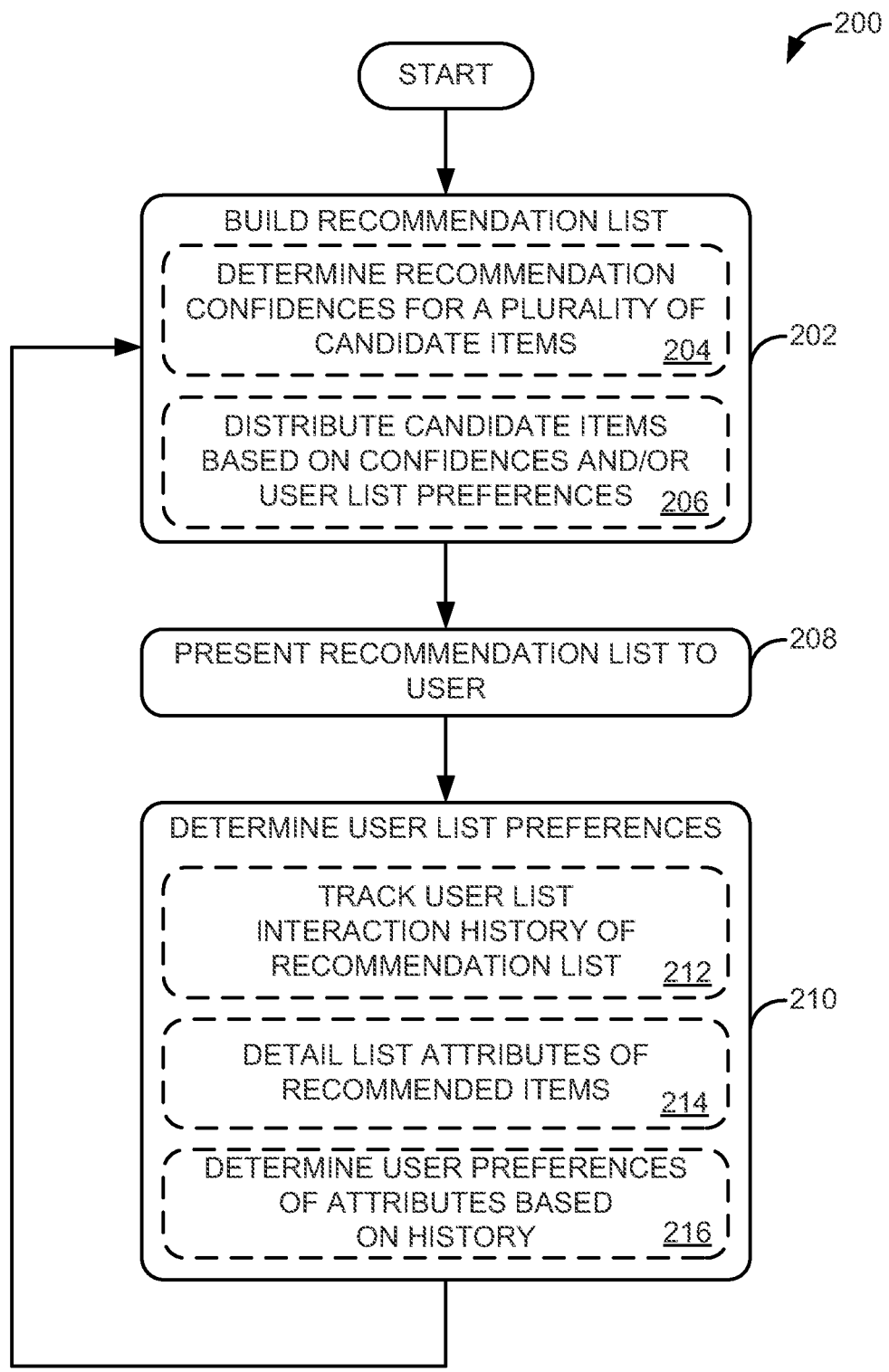
FIG. 2 is a flow chart illustrating a method for building a recommendation list using a recommendation system according to an embodiment of the present disclosure.

FIG. 2 shows a method 200 for optimizing a recommendation list. Method 200 may be carried out by the recommendation system 100. Method 200 comprises, at 202, building a recommendation list. The recommendation list may include candidate items recommended for the user. The candidate items on the recommendation list may be chosen based on any suitable mechanism. For example, as explained above with regard to FIG. 1, recommended items may be determined by input from the content catalogue 106, social graphs database 108, and/or user history 112, as nonlimiting examples.

Each candidate item may be assigned a recommendation confidence at 204. The recommendation confidence may be an indication of how likely the user is to view or purchase an item. These recommendation confidences may be based on user history 112, social graphs database 108, content catalogue 106, and/or any other suitable factors. Any suitable filter or algorithm may be used by a computing system to determine the recommendation confidences.

The candidate items are distributed within the recommendation list based on the recommendation confidences and/or user list preferences at 206. When the recommendation list is built for the first time, the candidate items may be presented based on the recommendation confidences alone. In some embodiments, there may be a default layout for the recommendation list, and the items may be placed in the layout according to the recommendation confidences. For example, the default layout may include a ten-item list having one column, and the candidate items may be distributed in descending order so that the ten highest recommendation confidence items are presented, and the higher recommendation confidence items are at the top of list. In other embodiments, when the recommendation list is built for the first time, the candidate items may be distributed randomly within the list.

However, if the user has previously been presented with one or more recommendation lists, the candidate items may be distributed within the list based on user list preferences as determined by user interaction with the previous lists. Distributing the candidate items based on user list preferences will be discussed in more detail below.

Method 200 proceeds to 208 to present the recommendation list to the user. Then, at 210, method 200 comprises determining user list preferences. Once the list has been presented to the user, the recommendation system is configured to track all user engagement with the recommendation list.

A user list interaction history of the recommendation list is tracked at 212. The user list interaction history details all user interaction with the list. User interaction with the list may include purchases of items on the list made by the user. Further, the user interaction may include actions taken by the user other than purchases. For example, the list may be presented on a display device of a computing system, and the computing system may include a user input device, such as a mouse. The user interaction history may detail all instances where the user clicked on an item on the list with the mouse, or all instances where the user hovered over and navigated around the item using the mouse. Any actions taken by the user that indicate a relative interaction with an item may be detailed in the list history.

Based on the user interaction with the recommendation list, list attributes of the recommendation list may be detailed at 214. It is important to note that aspects of the user interaction other than the actual items with which the user is interacting are detailed. That is, content-independent attributes of the items with which the user interacts are tracked. For example, the list attributes may include content-independent attributes that define the layout, format, etc. of the recommended items on the recommendation list. Example list attributes include the size, font, and color of the item on a user interface, the number of columns and subheadings on the list in which the item is presented, whether the item includes a picture and/or animation, the amount of textual information displayed on the user interface along with the item, the length of the list in which the item is presented, a relative position of the item within the list in which the item is presented, whether the item is from a "recommended for you" subgroup, from a "social" subgroup, or from a "popular" subgroup, etc.

User preferences of the attributes are determined at 216 based on the list interaction history. For example, if the user selects an item located on the bottom of the list, a user preference for selecting items located at the bottom of the list may be indicated. Again, it is to be noted that the manner in which the user interacts with the list may be considered independent of the contents of the list. In this way, it can be determined how the presentation of the recommended items may be particularly tailored to a particular user on a particular device.

Determining the user preferences of the attributes based on the history may be carried out by applying any suitable algorithm or filter, referred to herein as "preference determination logic". In one embodiment, the preference determination logic may include each type of user interaction with the list being given a different weight, so that attributes of items that were purchased are given a higher preference than attributes of items that were hovered over, for example. In another embodiment, each type of user interaction may be given the same weight. In other embodiments, different list attributes may be given different weights. Additionally, the type of device the user is viewing the list on may factor into the preference determination logic. For example, if the user is viewing the recommendation list on a mobile device, a lower weight may be given to attributes that might be difficult to view on the device, such as pictures and animation.

In some embodiments, the preference determination logic may be user-specific, wherein the recommendation system applies different logic to different users, and can learn which logic is most effective for each user based on subsequent list interaction histories. The preference determination logic may be used to automatically correlate one or more list preferences with a particular user based on that particular user's list interaction history.

Method 200 is iterative, and the user preferences determined at 210 can be considered when building a subsequent recommendation list at 202. As explained above, the subsequent list may include candidate recommendation items that have been given recommendation confidences at 204. These candidate recommendation items may be distributed in the list based on the recommendation confidences, and further based on the user list preferences at 206. In other words, each candidate item with a higher recommendation confidence may be prioritized over each candidate item with a lower recommendation confidence according to one or more list preferences correlated to a particular user. A candidate item having a relatively higher recommendation confidence than another candidate item may be given list attributes towards which the interaction history indicates that user has previously demonstrated relatively higher interaction. For example, if it was determined at 216 that the user has a preference for selecting items at the bottom of the list, the recommendation item with the highest recommendation confidence may be placed at the bottom of the recommendation list. In this way, a recommendation list that is customized not only for user-specific content but also for user-specific attributes of the recommendation list itself, may be presented to the user at 208.

Based on the new recommendation list presented to the user, new or updated user list preferences may be determined at 210, and used to build a subsequent recommendation list. The building of the list, presentation to the user, and determining list preferences may be iteratively repeated to continually optimize the recommendation lists presented to the user.

Figure 3:
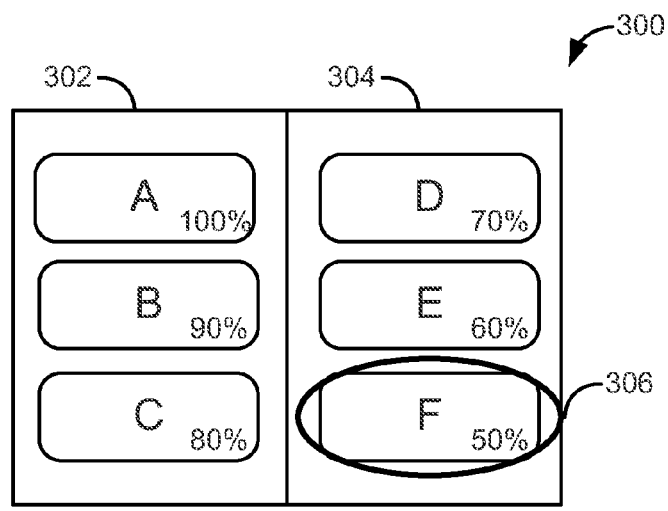
FIGS. 3-5 show various embodiments of an example recommendation list according to the present disclosure.
Figure 4:
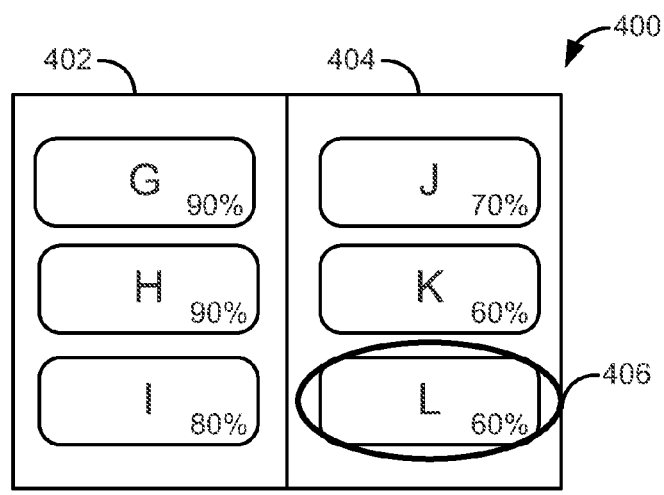
Figure 5:
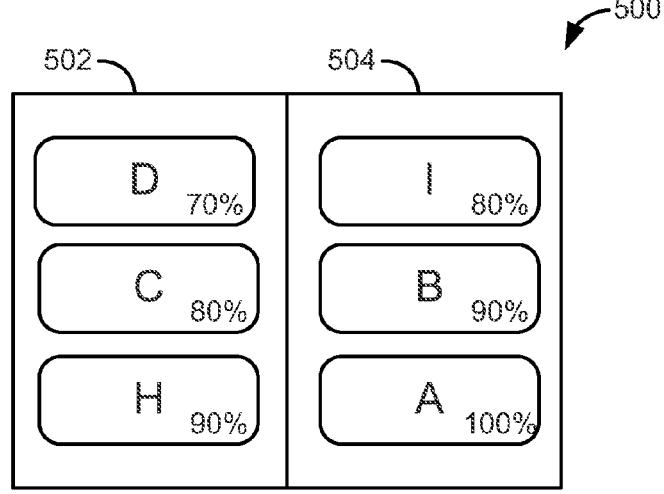

FIGS. 3-5 illustrate highly-simplified example recommendation lists according to various embodiments of the present disclosure. FIG. 3 illustrates a recommendation list 300 containing six items, A-F, arranged in two columns, column 302 and column 304. Each item has a recommendation confidence associated with it, indicated in the lower right corner as a percentage, where 100% indicates the highest confidence and 0% indicates the lowest confidence. The recommendation confidences are displayed for example only, and may not be visible to the user. Further, the confidences may be represented in any suitable way, such as from 0-10, 0-1, or in any other suitable manner. Recommendation list 300 may be compiled based on the recommendation confidences, such that the highest confidence item is displayed at the top of the list. FIG. 3 shows an ellipse 306 around item F, located at the bottom of column 304, indicating a user is interacting with item F (e.g., clicking on, hovering over, etc.).

FIG. 4 illustrates another recommendation list 400 that is presented to the user. Recommendation list 400 contains six items, G-L, arranged in two columns, 402 and 404. Similar to FIG. 3, the recommendation items may be placed according to their recommendation confidences. Ellipse 406 indicates the user is interacting with item L, also located at the bottom of column 404.

FIG. 5 illustrates another recommendation list 500 built based on the recommendation confidences as well as user preferences learned from the user selections of recommendation lists 300 and 400 illustrated in FIGS. 3 and 4. Recommendation list 500 includes six items arranged in two columns, 502 and 504. Based on lists 300 and 400, a user preference for the bottom position of a right-side column has been indicated. This preference is independent of the content of items F and L, and is instead based on the location of those items within the user interface. Accordingly, the highest confidence item, item A, has been placed in the position for which the user has previously demonstrated an interaction proclivity. Additionally, other high-confidence items, such as items B and H, have been placed nearby. Therefore, recommendation list 500 has been arranged based on user interaction with lists 300 and 400.

Figure 6A:
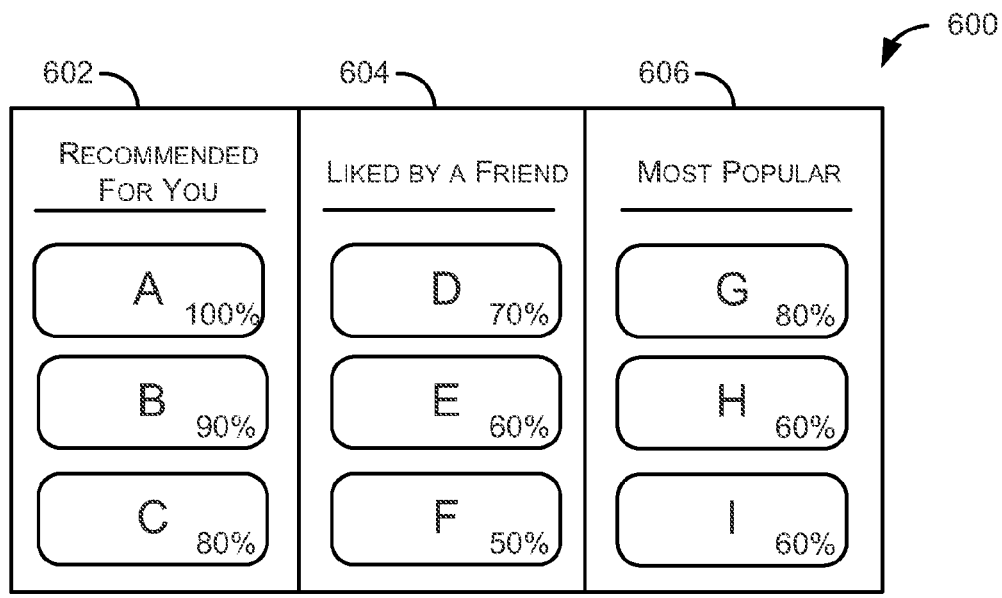
FIGS. 6A-6C show example recommendation lists according to an embodiment of the present disclosure.
Figure 6B:
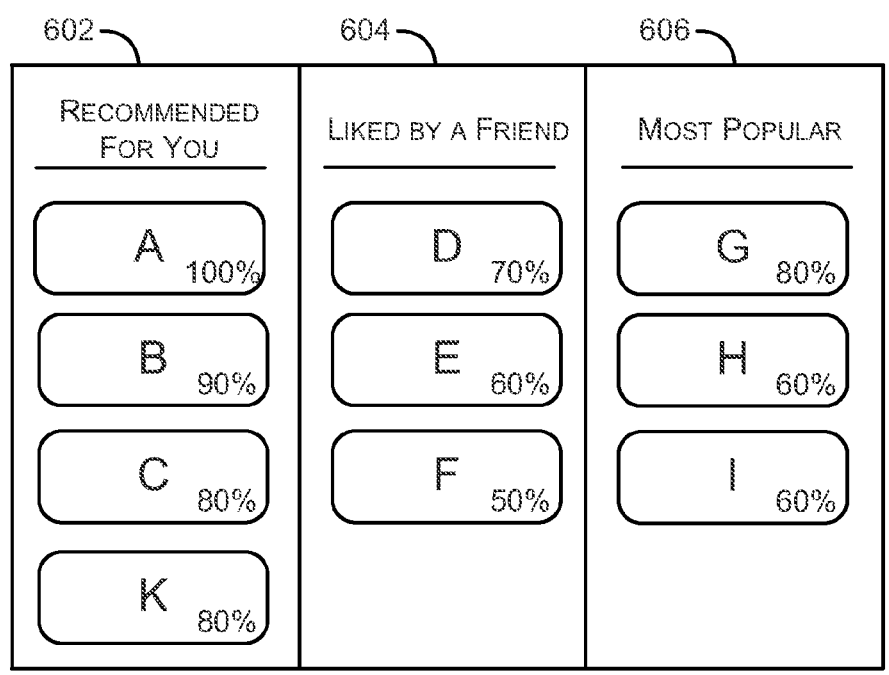
Figure 6C:
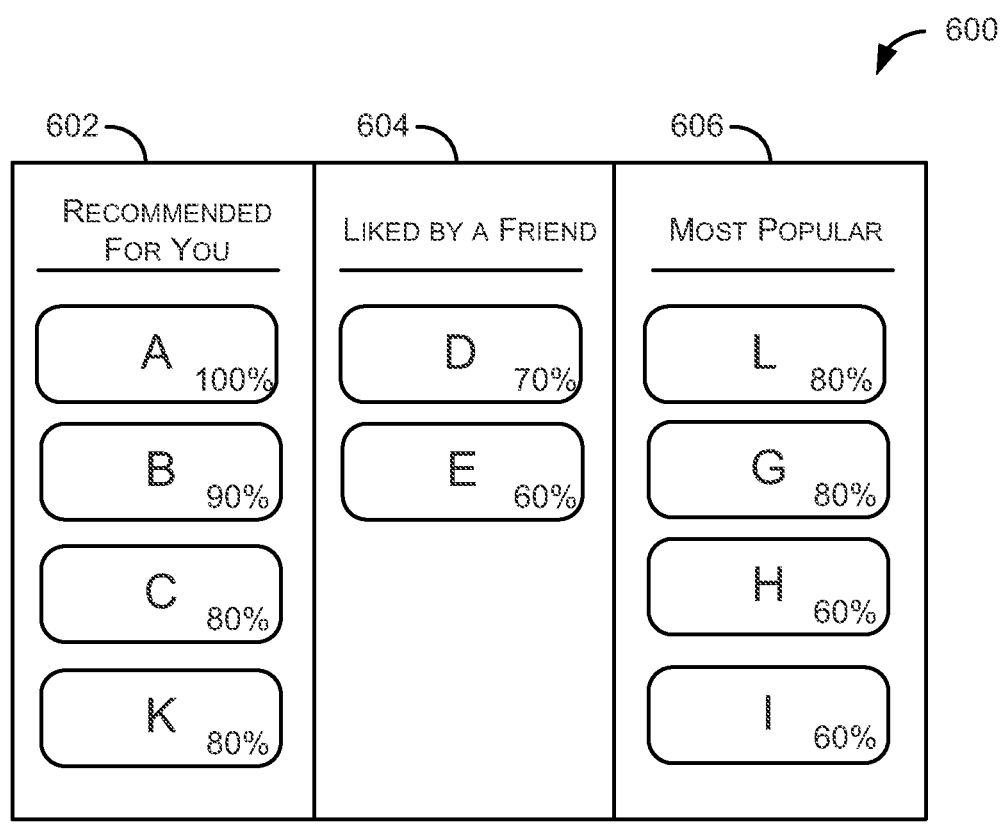

FIGS. 6A-6C illustrate a simplified user interface 600 including three different recommendation areas, 602, 604, and 606. Each area includes a different recommendation subgroup. Area 602 includes a "Recommended For You" subgroup, area 604 includes a social subgroup, "Liked by a Friend," and area 606 includes a "Most Popular" subgroup. As can be seen in FIGS. 6A-6C, the number of items included in each area may change over time based on user interaction with the list. For example, in FIG. 6A, the "Recommended For You" subgroup includes three items, while in FIGS. 6B and 6C, based on an increased user interaction with that subgroup, it has been expanded to include four items. Likewise, in FIGS. 6A and 6B, the "Most Popular" subgroup includes three items but expands to four items in FIG. 6C. As the "Liked by a Friend" subgroup has less user interaction than the other subgroups, in FIG. 6C it contracts to only include two items.

While these examples demonstrate that the number of items in a group may change over time based on user interaction, it should be understood that other changes can additionally or alternatively be made. As another nonlimiting example, if a user consistently chooses items recommended by a particular friend, items recommended by that friend may be promoted to a more prominent position in a group. As another example, if a user consistently chooses items located near the bottom of the display, the highest confidence items may be positioned at the bottom of the display.

It is to be understood that the above example is simplified, and more complex adaptations may be applied to lists and layouts. In essence, each time a list is presented to a user an experiment is performed to determine what promotes increased interaction, and changes can be made to subsequent lists based on such interactions. Depending on the preferences and proclivities demonstrated by the user, various aspects of the lists and layouts may be changed. Such changes may be gradually made from one list to the next, to avoid confronting the user with sudden changes that may be disorientating.

In some embodiments, the above described methods and processes may be tied to a computing system including one or more computers. In particular, the methods and processes described herein may be implemented as a computer application, computer service, computer API, computer library, and/or other computer program product.

Figure 7:
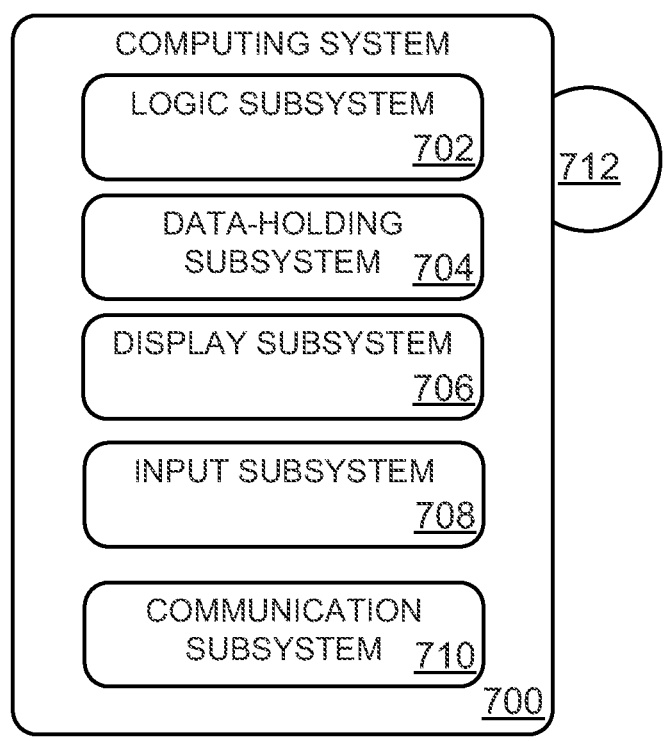
FIG. 7 schematically shows a computing system in accordance with embodiments of the present disclosure.

FIG. 7 schematically shows a nonlimiting computing system 700 that may perform one or more of the above described methods and processes, or portions thereof. For example, the recommender 102, view adapter 104, events processor 120, and/or user history 112 of FIG. 1 may take the form of computing system 700. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device, mobile communication device, gaming device, etc.

Computing system 700 includes a logic subsystem 702 and a data-holding subsystem 704. Computing system 700 may optionally include a display subsystem 706, communication subsystem 710, and/or other components not shown in FIG. 7. Computing system 700 may also optionally include a user input subsystem 708 including devices such as keyboards, mice, game controllers, cameras, microphones, and/or touch screens, for example. Input subsystem 708 may provide a user various ways to interact with recommended items, as described above.

Logic subsystem 702 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 704 may include one or more physical, non-transitory, devices configured to hold data and/or instructions executable by the logic subsystem to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 712, which may be used to store and/or transfer data and/or instructions executable to implement the herein described methods and processes. Removable computer-readable storage media 712 may take the form of CDs, DVDs, HD-DVDs, Blu-Ray Discs, EEPROMs, and/or floppy disks, among others.

It is to be appreciated that data-holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 700 that is implemented to perform one or more particular functions. In some cases, such a module, program, or engine may be instantiated via logic subsystem 702 executing instructions held by data-holding subsystem 704. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, communication subsystem 710 may be configured to communicatively couple computing system 700 with one or more other computing devices. Communication subsystem 710 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A recommendation system, comprising:
   a logic subsystem comprising a processor; and
   a data-holding subsystem holding instructions executable by the processor to:
   generate for display a list of recommended items to a user, each recommended item having a different position in the list relative to each other recommended item of the list;
   dynamically track a list interaction history of a user, the list interaction history detailing list attributes of recommended items with which that user interacts, wherein the list attributes are independent of content attributes of such recommended items and wherein a list attribute of the list attributes describes a position in the list corresponding to a recommended item;
   for each position in the list, calculate a frequency with which the user interacts with an item in said position based on the list attribute of the list interaction history;
   identify a position which the user has previously demonstrated a greatest frequency of interaction based on the frequency calculated for each respective position in the list; and
   build a recommendation list with a plurality of candidate items having different recommendation confidences such that a candidate item having a highest recommendation confidence is presented in the identified position.

2. The system of claim 1, wherein the list attributes for each recommended item comprise one or more of a size of that item on a user interface, a color of that item on the user interface, a position of that item on the user interface, and a font of that item on the user interface.

3. The system of claim 1, wherein the list attributes for each recommended item comprise a number of columns of a list in which that item is presented.

4. The system of claim 1, wherein the list attributes for each recommended item comprise a number of subheadings on a list in which that item is presented.

5. The system of claim 1, wherein the list attributes for each recommended item comprise whether that item includes one or more of a picture and an animation.

6. The system of claim 1, wherein the list attributes for each recommended item comprise an amount of textual information displayed on the user interface along with that item.

7. The system of claim 1, wherein the list attributes for each recommended item comprise a length of a list in which that item is presented.

8. The system of claim 1, wherein the list attributes for each recommended item comprise whether that item is from a "recommended for you" subgroup, from a "social" subgroup, or from a "popular" subgroup.

9. The system of claim 1, wherein the recommendation confidences are determined by a collaborative filter.

10. The system of claim 1, wherein the recommendation confidences are determined by a features filter.

11. A method of providing recommendations, comprising:
    generating for display a list of recommended items to a user, each recommended item having a different position in the list relative to each other recommended item of the list;
    dynamically tracking a list interaction history of a user, the list interaction history detailing list attributes of recommended items with which that user interacts, wherein the list attributes are independent of content attributes of such recommended items and wherein a list attribute of the list attributes describes a position in the list corresponding to a recommended item;
    for each position in the list, calculating a frequency with which the user interacts with an item in said position based on the list attribute of the list interaction history;
    identifying a position which the user has previously demonstrated a greatest frequency of interaction based on the frequency calculated for each respective position in the list; and
    building a recommendation list with a plurality of candidate items having different recommendation confidences such that a candidate item having a highest recommendation confidence is presented in the identified position.

12. The method of claim 11, wherein the list attributes for each recommended item comprise one or more of a size of that item on a user interface, a position of that item on the user interface, a color of that item on the user interface, and a font of that item on the user interface.

13. The method of claim 11, wherein the list attributes for each recommended item comprise a number of columns of a list in which that item is presented.

14. The method of claim 11, wherein the list attributes for each recommended item comprise a number of subheadings on a list in which that item is presented.

15. The method of claim 11, wherein the list attributes for each recommended item comprise whether that item includes one or more of a picture and an animation.

16. The method of claim 11, wherein the list attributes for each recommended item comprise an amount of textual information displayed on the user interface along with that item.

17. The method of claim 11, wherein the list attributes for each recommended item comprise a length of a list in which that item is presented.

18. The method of claim 11, wherein the list attributes for each recommended item comprise whether that item is from a "recommended for you" subgroup, from a "social" subgroup, or from a "popular" subgroup.

19. The method of claim 11, wherein the recommendation confidences are determined by a collaborative filter.

20. The method of claim 11, wherein the recommendation confidences are determined by a features filter.

* * * * *